United States Patent
Walkingshaw et al.

(10) Patent No.: US 9,037,592 B2
(45) Date of Patent: May 19, 2015

(54) GENERATING AN IMPLIED OBJECT GRAPH BASED ON USER BEHAVIOR

(71) Applicant: Flipboard, Inc., Palo Alto, CA (US)

(72) Inventors: Andrew David Walkingshaw, San Francisco, CA (US); Boris Lev Aleksandrovsky, Berkeley, CA (US); Arthur Anthonie van Hoff, Menlo Park, CA (US); Markus Breunig, Rosenheim (DE)

(73) Assignee: Flipboard, Inc., Palo Alto, CA (US)

( * ) Notice: Subject to any disclaimer, the term of this patent is extended or adjusted under 35 U.S.C. 154(b) by 176 days.

(21) Appl. No.: 13/905,016

(22) Filed: May 29, 2013

(65) Prior Publication Data

US 2014/0074863 A1    Mar. 13, 2014

Related U.S. Application Data

(60) Provisional application No. 61/700,308, filed on Sep. 12, 2012, provisional application No. 61/752,952, filed on Jan. 15, 2013.

(51) Int. Cl.
*G06F 17/30* (2006.01)
*G06F 7/00* (2006.01)
*H04L 29/06* (2006.01)

(52) U.S. Cl.
CPC ............ *G06F 17/3053* (2013.01); *H04L 65/40* (2013.01); *G06F 17/30867* (2013.01)

(58) Field of Classification Search
USPC ........................................................ 707/748
See application file for complete search history.

(56) References Cited

U.S. PATENT DOCUMENTS

| | | | |
|---|---|---|---|
| 8,788,487 B2* | 7/2014 | Stout et al. ................... | 707/722 |
| 2005/0105134 A1 | 5/2005 | Moneypenny et al. | |
| 2008/0120670 A1 | 5/2008 | Easton et al. | |
| 2009/0049374 A1 | 2/2009 | Echenberg | |
| 2010/0049770 A1 | 2/2010 | Ismalon | |
| 2010/0306249 A1* | 12/2010 | Hill et al. ..................... | 707/769 |
| 2011/0047368 A1 | 2/2011 | Sundaramurthy et al. | |

(Continued)

FOREIGN PATENT DOCUMENTS

WO    WO 2010/132491 A2    11/2010

OTHER PUBLICATIONS

PCT International Search Report and Written Opinion for PCT/US2013/059302, Jan. 28, 2014, 11 Pages.

(Continued)

*Primary Examiner* — Kuen Lu
(74) *Attorney, Agent, or Firm* — Fenwick & West LLP

(57) ABSTRACT

An online system generates implied links between objects distributed by the online system based on a plurality of users' behaviors with respect to the objects. For a behavior of a user with respect to an object that satisfies a link criterion, the online system identifies a connection between the user and the object. Local object graphs are generated to represent the relationships between the objects connected to each user, and the local object graphs are merged into a global object graph. An adjacency matrix is extracted from the global object graph as a representation of the strength of relationships between the objects distributed by the online system. The online system may then apply graph analysis techniques to the adjacency matrix, thereby analyzing the relationships between the objects without relying upon explicit links between the objects.

20 Claims, 5 Drawing Sheets

(56) References Cited

U.S. PATENT DOCUMENTS

| | | |
|---|---|---|
| 2011/0265011 A1 | 10/2011 | Taylor |
| 2011/0302064 A1 | 12/2011 | Dunkeld et al. |
| 2012/0110678 A1 | 5/2012 | Kumble |
| 2012/0203640 A1 | 8/2012 | Karmarkar et al. |
| 2012/0221555 A1 | 8/2012 | Byrne et al. |
| 2012/0254188 A1 | 10/2012 | Koperski et al. |
| 2012/0297490 A1 | 11/2012 | Barraclough et al. |
| 2014/0067825 A1* | 3/2014 | Oztaskent et al. ............ 707/748 |
| 2014/0075296 A1* | 3/2014 | Schaad et al. ................. 715/243 |

OTHER PUBLICATIONS

PCT International Search Report and Written Opinion for PCT/US2013/059297, Jan. 28, 2014, 15 Pages.

PCT International Search Report and Written Opinion for PCT/US2013/059298, Jan. 28, 2014, 15 Pages.

* cited by examiner

GENERATING AN IMPLIED OBJECT GRAPH BASED ON USER BEHAVIOR

CROSS REFERENCE TO RELATED APPLICATIONS

This application claims the benefit of U.S. Provisional Application No. 61/700,308, filed Sep. 12, 2012, and U.S. Provisional Application No. 61/752,952, filed Jan. 15, 2013, which are incorporated by reference in their entirety.

BACKGROUND

This invention relates to generating an implied object graph based on user behavior.

Various analytical techniques are used to understand relationships between objects in online systems, such as web pages and other documents or items of content. These techniques include, for example, techniques for calculating a global ranking for objects in a corpus of objects, determining a centrality of objects in a corpus, and comparing a similarity of object graphs. But each of these techniques requires a citation graph, which is a graph of links between the objects in the corpus of objects. Citation graphs are often generated by examining explicit links between the objects in the corpus, such as web pages that link to other web pages. But in the absence of explicit links, these analytical techniques for understanding relationships between the objects cannot be used.

SUMMARY

An online system monitors behaviors of users with respect to objects, such as documents distributed by or accessible from the online system. Based on the monitored behaviors, the online system determines connections between the objects and one or more users who interacted with the objects. If more than one object is connected to a given user, the online system generates implied links between the objects that are connected to the same user. The implied links between objects connected to the same user may be represented as a local object graph for that user. The online system then merges local object graphs constructed for each of a plurality of users to generate a global object graph. The global object graph represents the relationships within a corpus of objects in the online system, as indicated by users' mutual interests in the objects.

In one embodiment, the online system extracts an adjacency matrix from the global object graph, or from each local object graph. An adjacency matrix stores the links among the objects in the global object graph, which may be measured using weights that represent the strength or closeness of the links between two objects in the global object graph. Using the adjacency matrix and the weights, the online system may apply graph analysis techniques to analyze the relationships between the objects in the corpus. Accordingly, embodiments described herein enable the analysis of the relationships between objects in the online system without relying upon explicit links between the objects.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

An online system identifies implied links between objects based on user interactions with the objects. Using these connections, the online system generates an implied object graph representing the relationships between the objects. The online system may analyze the object graph to determine the global rank of objects in the system. The objects may then be ranked based on their global ranks to provide recommendations and relevant search results to users. By inferring relationships between the objects based on the same user having interacted with the objects, the online system calculates the global rank of objects without relying on explicit links between the objects.

Figure 1:
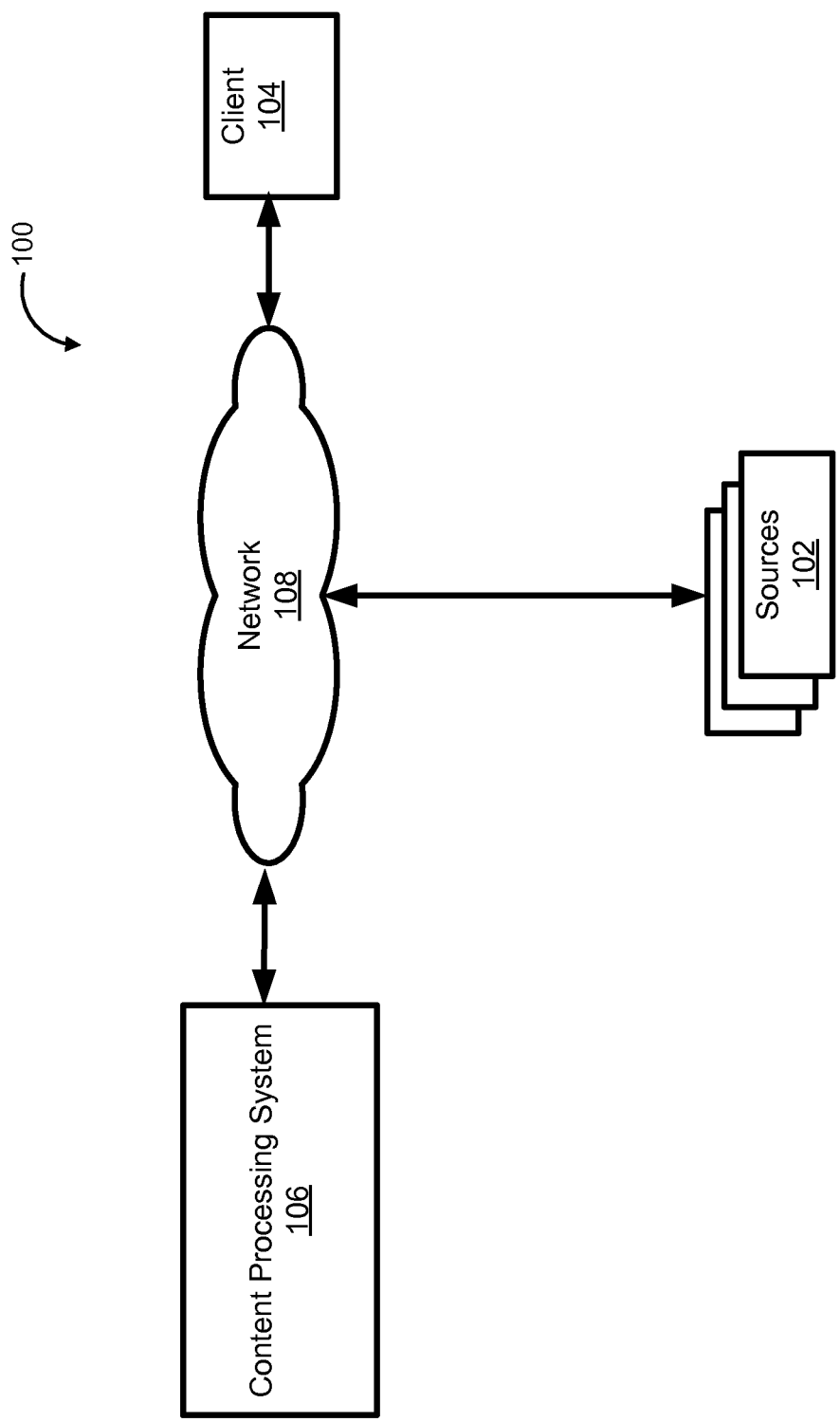
FIG. 1 is a high-level block diagram of a system environment for generating an implied object graph, according to one embodiment.

FIG. 1 illustrates one embodiment of a system environment 100 for generating an implied object graph. The environment 100 includes content sources 102, a client 104, and a content processing system 106 in communication over a network 108. The sources 102 comprise computing systems that may provide various types of content such as text, images, videos, or audio on web pages, web feeds, social networks, or other distribution platforms. The content may include content provided by publishers, such as stories about news events, product information, entertainment, or educational material. Content may also include user-generated content such as blogs, tweets, shared images, video or audio, and social networking posts and status updates. For convenience, content from a source, regardless of its composition, may be referred to herein as a "content item" or simply "content."

The content processing system 106 receives content items from the sources 102, processes the content items to build pages, and serves the pages to a client 104. The content processing system 106 may group pages into "sections," where each section includes pages from a similar source, relating to a similar topic, or otherwise determined to be similar. The pages and sections, as well as domains or URLs associated with the content sources 102, are referred to herein as "objects" in the system environment 100. Other objects may also be present in the system environment 100. The set of all objects in the environment 100 make up a "corpus" of objects.

A client 104 can be any computing device equipped with a browser for accessing web pages and a display for viewing them, such as a personal computer, a tablet computer, or a mobile device. A client 104 receives pages from the content processing system 106 and displays them to a user. Although a single client 104 is shown in FIG. 1, in practice there may be thousands or millions of clients 104 in communication with the content processing system 106.

Using the clients 104, users interact with the objects in the environment 100 by, for example, reading content, saving content, adding content to a feed, or sharing content with social network connections. The content processing system 106 monitors users' interactions with the objects to identify connections between users and objects. Based on the user-object connections, the content processing system 106 generates implied links between objects and constructs an implied object graph. Similarly, the content processing system 106 may infer probabilistic weights for the implied links. The content processing system 106 may use information about the implied links and their respective probabilistic weights to calculate object-object proximity. This enables proximity to be calculated without relying on explicit links between objects.

Figure 2:
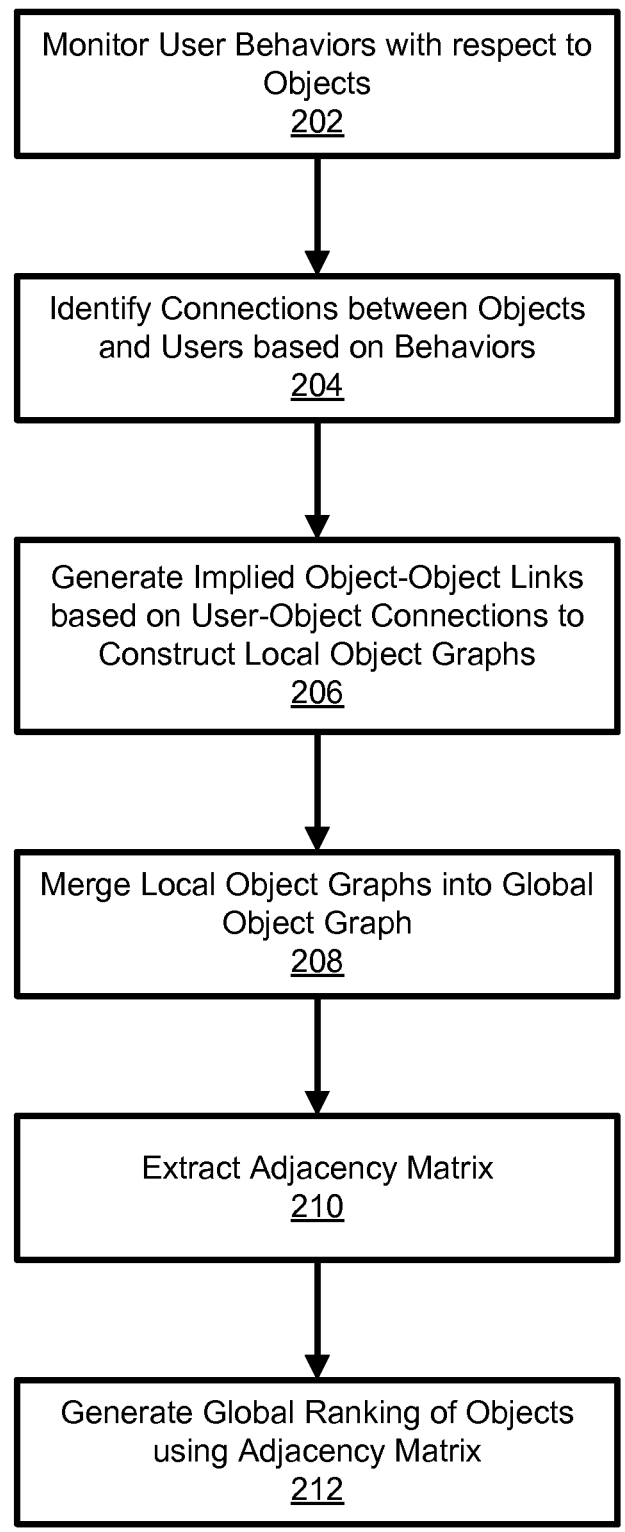
FIG. 2 is a flowchart illustrating a method for generating an implied object graph, according to one embodiment.

A process for generating an implied object graph is illustrated in the flowchart of FIG. 2. In one embodiment, the steps of the process are performed by the content processing system 106. In other embodiments, the content processing system 106 may perform the illustrated steps in different orders, and/or perform different or additional steps.

The content processing system 106 monitors 202 user behaviors with respect to the objects of the corpus. If the objects are documents or other content items, the behaviors may include, for example, providing explicit positive or negative feedback about the content item, such as by adding the content item to a favorites collection or by reporting the content item as spam or abusive, or providing implicit feedback about the item, such as by reading or viewing the content item. For reading or viewing the content item, the system may take into account the user's dwell time (i.e., the amount of time a user spends reading a content item). Other behaviors may include social sharing activities (e.g., sharing an object with one or more connections on a social network).

In one embodiment, the content processing system 106 monitors user behaviors over a sliding time window that depends, for example, on the type of object. The sliding time window provides behaviors that are contemporary enough to be relevant. For example, the content processing system 106 may behaviors of users with respect to news articles over a relatively short time period (e.g., 24 hours), as a given news article may only be relevant for a short period of time. Similarly, the content processing system 106 may monitor behaviors of users with respect to sections over a longer time period (e.g., two weeks), as the relevance of a section may attenuate less rapidly. Rather than filtering behaviors based on time, the impact of the monitored behaviors may also be decayed based on the time since the behavior occurred, thereby providing a smooth drop of the effect of that behavior on the implied graph. Different types of behaviors may be decayed at different rates, or not at all. For example, a user's reading a document may be decayed faster than a user's providing explicit feedback that the document is interesting to the user.

Figure 3A:
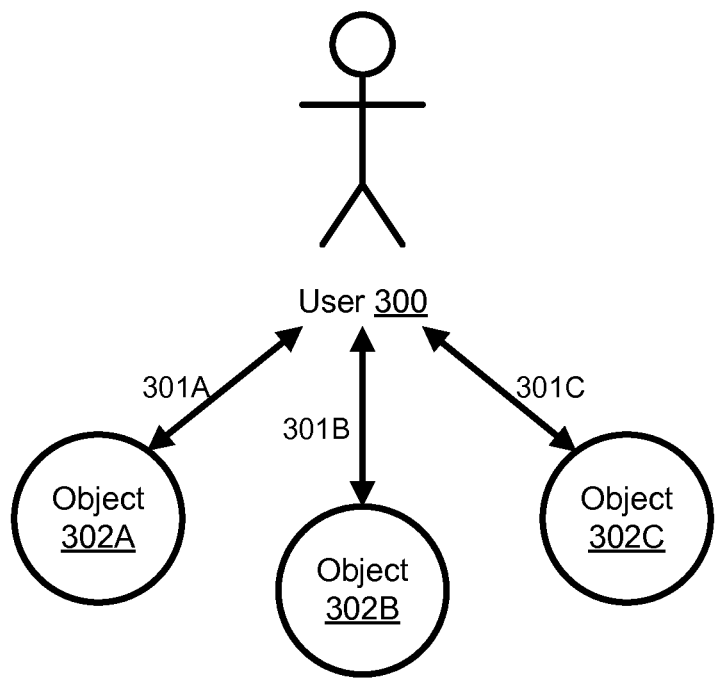
FIG. 3A is a diagram illustrating example links between objects and a user.

Based on user behaviors with respect to the objects, the content processing system 106 identifies 204 connections between users and objects. In particular, if a user's behavior with respect to an object satisfies a link criterion, the content processing system 106 creates a connection between the user and the object. Link criteria may include, for example, reading the content of an object, dwelling on an object for longer than a threshold dwell time, or sharing the object with a social network connection. An example set of connections between a user 300 and objects 302 is illustrated in FIG. 3A. The connections 301 represent the relationships between the user 300 and each of the objects 302, determined based on the behavior of the user 300 with respect to the objects 302 satisfying a link criterion.

The content processing system 106 may also quantify the strength of the connections between objects and users based on the link criteria, with each link criterion associated with a weight. Different types of user interactions with objects may lead to differently weighted links between the user and the objects. For example, a social sharing criterion may be weighted more heavily than a reading criterion, since a user who shares an object with other users is likely to be more interested in the object than a user who merely reads the content. As another example, a longer dwell time may be weighted more heavily than a shorter dwell time. As mentioned above, these weights may be decayed over time, thereby lessening the impact of the user behaviors to the implied graph as those actions become stale.

Figure 3B:
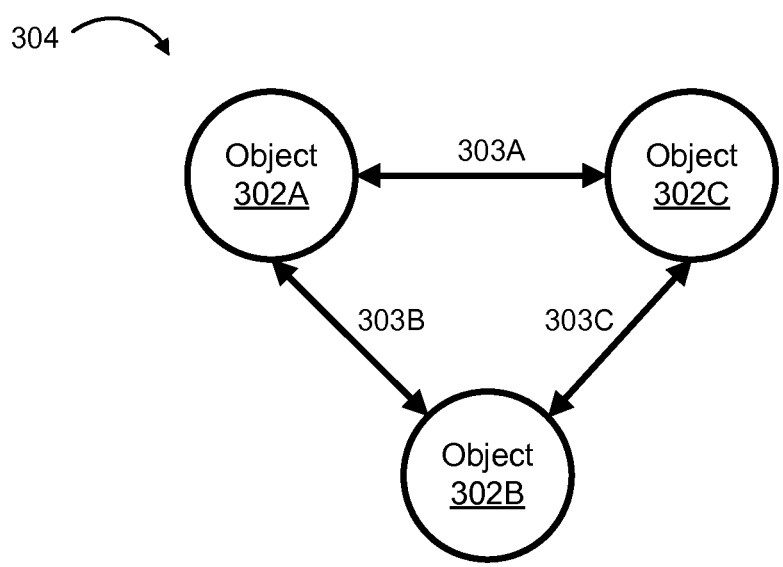
FIG. 3B is a diagram illustrating an example local object graph resulting from the links between objects and a user shown in FIG. 3A.

If two or more objects are linked to a common user, the content processing system 106 generates 206 implied links between the objects and constructs a local object graph. As used herein, a "local object graph" represents the relationships among the objects with which a given user interacts. An example of a local object graph is illustrated in FIG. 3B. The local object graph is formed from the objects 302 that were linked to the user 300, as illustrated in FIG. 3A. Based on the user's behavior with respect to each of the objects 302, the content processing system 106 generates the implied links 303 between the objects 302, thereby generating the local object graph 304.

The implied links between the objects 302 may be associated with weights, which are determined based on the weights of the links between the user 300 and the objects 302. In various embodiments, a weight for an implied link between two objects connected to a user may be an arithmetic mean of the weights between each object and the user, the geometric mean of the user-object connections, a summation of the logarithms of each of the two user-object link weights, or the greater of the two user-object link weights. Other methods of calculating weights for the implied links are also possible. In another embodiment, the content processing system 106 assigns weights to implied links between objects by summing the user-object link weights for the set of objects connected to a given user. If the cumulative weight of two user-objects connections is in the top n cumulative link weights associated with the user, the weight of the implied link between the two corresponding objects is assigned to a value of 1. Otherwise, the weight is assigned to a value of zero. For example, objects A, B, and C are connected to a user. The weight of the link between object A and the user is wA, the weight of the link between object B and the user is wB, and wC is the weight of the link between object C and the user. The content processing system 106 calculates the sums sAB=wA+wB, sAC=wA+wC, and sBC=wB+wC. If, for example, it is determined that sAB>sAC>sBC, the content processing system 106 may assign the implied link between objects A and B a weight of 1, and assigns weights of 0 to the implied links between objects A and C and between B and C. The number n of cumulative link weights assigned to a value of 1 may be selected so as to provide sparsity in an adjacency matrix result from the implied object-object links.

The content processing system 106 may generate local object graphs for each user (or a subset of the users) who interacts with content served by the content processing system 106. If an object occurs in more than one of the local object graphs, the content processing system 106 merges 208 the local objects graphs containing the object. The result of merging 208 the local object graphs is a global object graph representing relationships of the objects in the corpus.

Figure 3C:
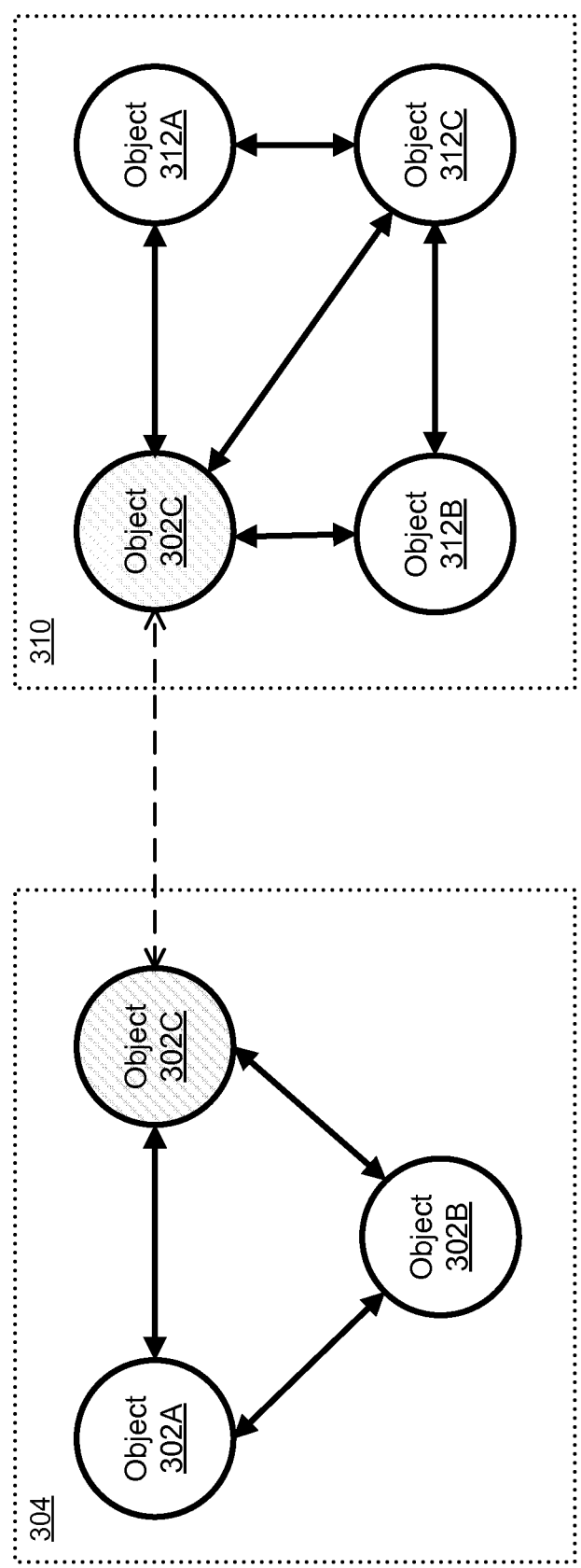
FIG. 3C is a diagram illustrating the merging of the local object graph of FIG. 3B with another local object graph.
Figure 3D:
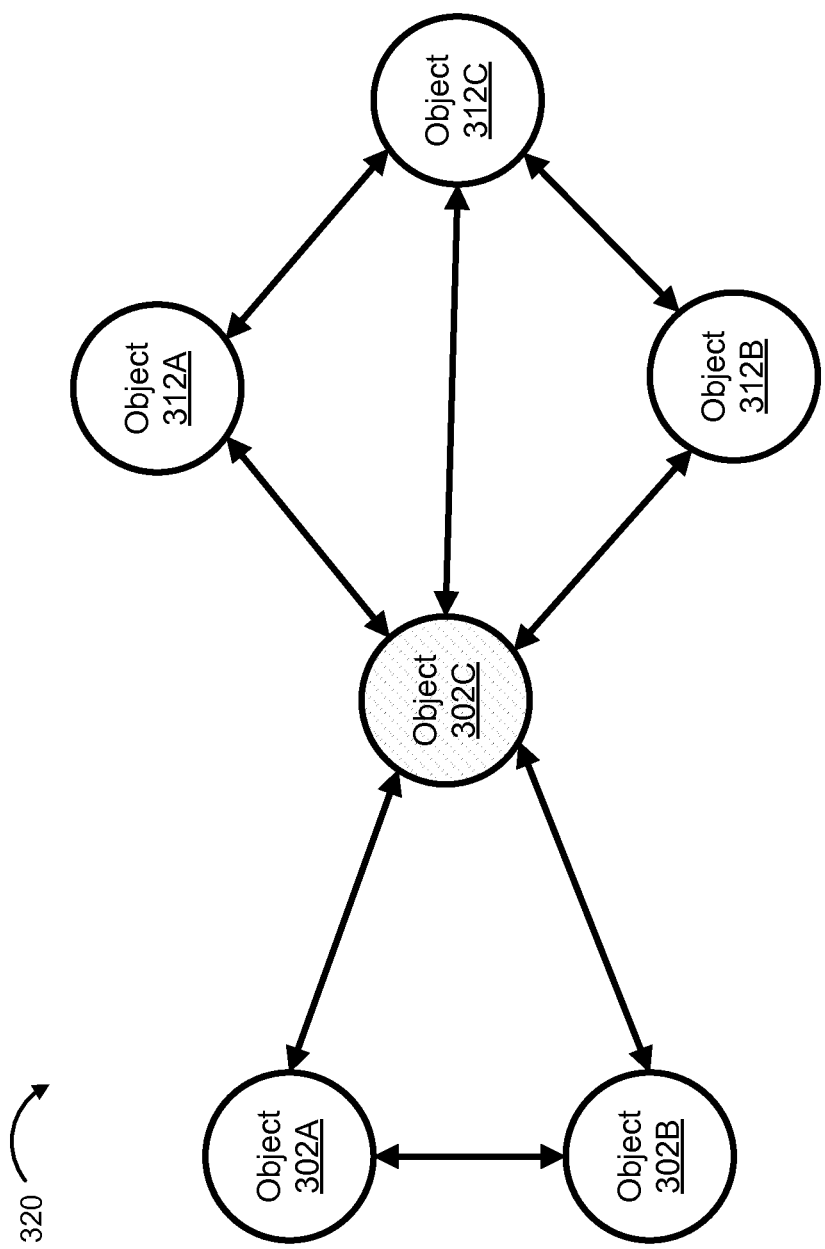
FIG. 3D is a diagram illustrating an example global object graph resulting from the merger of the two local graphs shown in FIG. 3C.

The merging 208 of two local object graphs having at least one object in common is illustrated in FIGS. 3C and 3D. Specifically, FIG. 3C illustrates a local graph 310 including objects 312 and object 302C, with implied links between each of the objects 312 and object 302C. Based on the mutual connections between objects 312, objects 302, and object 302C, the content processing system 106 merges the local graphs 304, 310 to generate the global object graph 320 illustrated in FIG. 2D. Although only six objects are illustrated in FIG. 2D, in practice the content processing system 106 may merge thousands or millions of objects into a global object graph.

In one embodiment, the content processing system 106 extracts 210 an adjacency matrix from the global object graph. The content processing system 106 may alternatively extract 210 an adjacency matrix from each local object graph and generate the adjacency matrix for the global object graph based on the local adjacency matrices. The adjacency matrix is a data structure representing the implied links between the objects in the corpus, and it may be stored on a computer-readable storage medium, such as a memory of the content processing system 106. The content processing system 106 may use the adjacency matrix and graph analysis techniques to rank the objects, recommend objects to users, or otherwise analyze the relationships between the objects. For example, the content processing system 106 may use power iteration to calculate the eigenvector centrality of the objects, representing the influence of each object in the global object graph. Accordingly, the embodiments disclosed herein enable the content processing system 106 to apply techniques from graph theory that were not available in the absence of explicit object-object links.

One application of an implied object graph as described herein provides a method for ranking objects in a digital magazine. For example, a digital magazine application may provide a personalized, customizable digital magazine for a user. Based on selections made by the user and/or on behalf of the user, the digital magazine may contain a personalized collection of content from a number of sources, thereby providing a useful interface by which the user can consume content that interests and inspires the user.

The digital magazine may be organized into a number of sections, where each section contains content obtained from a particular source or otherwise has a common characteristic. For example, one section of the digital magazine may include articles from an online news source (such as a website for a news organization), another section may contain articles from a third-party-curated collection of content around a particular topic (e.g., a technology compilation), and yet another section may contain content obtained from the user's account on one or more social networking systems.

As one example, the digital magazine application may recommend objects to users of the digital magazine based on the implied object graph. For example, the digital magazine application may identify an implied link between articles A and B. If a user reads article A, the digital magazine application may recommend article B to the user based on the implied links between the articles.

As another example, the digital magazine application may rank objects in the digital magazine based on the implied object graph, and use the ranking to provide relevant search results to users. For example, users of the digital magazine may submit search queries for articles or sections relating to a particular topic. In response to receiving the search query, the digital magazine application may identify articles and/or sections corresponding to the query as search results. The digital magazine application may then rank the search results for presentation to the user based on the eigenvector centrality of the corresponding objects in the digital magazine. Alternatively, the digital magazine application may suggest high-ranking ranking objects to human editors, who may then perform further processing to generate content packages. For example, editors may be alerted to popular user-generated content, which they may choose to promote within the digital magazine application to other users. Furthermore, the highly-ranked objects may be analyzed by algorithmic editing processes to determine entities (such as people, places, organizations, concepts, or events) named in the objects. If common entities are named in the highly-ranked objects, the digital magazine application may identify trends in currently dominant topics of discussion.

As yet another example, the digital magazine application may construct a section based on implied links between articles, URLs, or other objects. For example, if the digital magazine application identifies an implied link between an article C and a URL D, and the digital magazine application adds article C to a section, the digital magazine application may also add articles (or other content) retrieved from URL D to the section. Thus, a section may comprise a set of objects linked to one another in a global object graph of the digital magazine.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating an implied object graph, the method comprising:
   identifying a plurality of user behaviors by an online system, each user behavior comprising an interaction with an object of a plurality of objects and performed by a user of a plurality of users of the online system;
   generating a plurality of local object graphs, each local object graph associated with a user of the plurality of users and comprising a subset of the objects with which the user interacted and links between objects of the subset;
   determining a weight for each of the links in the local object graphs, the weight determined based on the corresponding user behavior;
   merging the plurality of local object graphs to generate a global object graph, the global object graph comprising the plurality of objects and links between the plurality of objects;
   determining a weight for each of the links in the global object graph based on the weights of the merged local object graphs; and
   storing the links and the corresponding weights from the global object graph in an adjacency matrix.

2. The method of claim 1, further comprising:
   ranking the objects in the online system based on the adjacency matrix and the weights.

3. The method of claim 1, wherein identifying the plurality of user behaviors comprises:
   monitoring the user behaviors over a sliding time window.

4. The method of claim 1, wherein a user behavior of the plurality of user behaviors is a user viewing the object, and wherein generating a plurality of local object graphs comprises:
   responsive to the user viewing the object, identifying a connection between the user and the object.

5. The method of claim 1, wherein generating the plurality of local objects graphs comprises:
   responsive to a user of the plurality of users interacting with an object for longer than a threshold dwell time, identifying a connection between the object and the user.

6. The method of claim 1, wherein generating the plurality of local object graphs comprises:
   responsive to a user of the plurality of users sharing an object on a social networking system, identifying a connection between the object and the user.

7. The method of claim 1, wherein generating the plurality of local object graphs comprises:
   identifying connections between respective objects and users responsive to the corresponding user behavior having occurred within a recent time period.

8. The method of claim 1, wherein a user behavior of the plurality of user behaviors is an explicit feedback signal supplied by a user and corresponding to an object of the plurality of objects, and wherein generating the plurality of local object graphs comprises:
   responsive to receiving the explicit feedback signal, identifying a connection between the user and the corresponding object.

9. The method of claim 1, wherein determining the weight for each of the links in the local object graphs comprises:
   determining the weight based on a type of the corresponding user behavior.

10. The method of claim 1, wherein determining the weight for each of the links in the local object graphs comprises:
    decaying the weight based on a time since the corresponding user behavior was identified.

11. A non-transitory computer-readable medium storing computer program instructions for generating an implied object graph, the computer program instructions comprising instructions for:
    identifying a plurality of user behaviors by an online system, each user behavior comprising an interaction with an object of a plurality of objects and performed by a user of a plurality of users of the online system;
    generating a plurality of local object graphs, each local object graph associated with a user of the plurality of users and comprising a subset of the objects with which the user interacted and links between objects of the subset;
    determining a weight for each of the links in the local object graphs, the weight determined based on the corresponding user behavior;
    merging the plurality of local object graphs to generate a global object graph, the global object graph comprising the plurality of objects and links between the plurality of objects;
    determining a weight for each of the links in the global object graph based on the weights of the merged local object graphs; and
    storing the links and the corresponding weights from the global object graph in an adjacency matrix.

12. The non-transitory computer-readable storage medium of claim 11, the instructions further comprising instructions for:
    ranking the objects in the online system based on the adjacency matrix and the weights.

13. The non-transitory computer-readable storage medium of claim 11, wherein identifying the plurality of user behaviors comprises:
    monitoring the user behaviors over a sliding time window.

14. The non-transitory computer-readable storage medium of claim 11, wherein a user behavior of the plurality of user behaviors is a user viewing the object, and wherein generating a plurality of local object graphs comprises:
    responsive to the user viewing the object, identifying a connection between the user and the object.

15. The non-transitory computer-readable storage medium of claim 11, wherein generating the plurality of local objects graphs comprises:
    responsive to a user of the plurality of users interacting with an object for longer than a threshold dwell time, identifying a connection between the object and the user.

16. The non-transitory computer-readable storage medium of claim 11, wherein generating the plurality of local object graphs comprises:
    responsive to a user of the plurality of users sharing an object on a social networking system, identifying a connection between the object and the user.

17. The non-transitory computer-readable storage medium of claim 11, wherein generating the plurality of local object graphs comprises:
   identifying connections between respective objects and users responsive to the corresponding user behavior having occurred within a recent time period.

18. The non-transitory computer-readable storage medium of claim 11, wherein a user behavior of the plurality of user behaviors is an explicit feedback signal supplied by a user and corresponding to an object of the plurality of objects, and wherein generating the plurality of local object graphs comprises:
   responsive to receiving the explicit feedback signal, identifying a connection between the user and the corresponding object.

19. The non-transitory computer-readable storage medium of claim 11, wherein determining the weight for each of the links in the local object graphs comprises:
   determining the weight based on a type of the corresponding user behavior.

20. The non-transitory computer-readable storage medium of claim 11, wherein determining the weight for each of the links in the local object graphs comprises:
   decaying the weight based on a time since the corresponding user behavior was identified.

\* \* \* \* \*